(12) United States Patent
Fu et al.

(10) Patent No.: US 9,665,820 B2
(45) Date of Patent: May 30, 2017

(54) LOAD MODULATION CIRCUIT FOR RADIO FREQUENCY IDENTIFICATION

(71) Applicant: Shanghai Huahong Integrated Circuit Co., Ltd., Shanghai (CN)

(72) Inventors: Zhijun Fu, Shanghai (CN); Heliang Ma, Shanghai (CN)

(73) Assignee: Shanghai Huahong Integrated Circuit Co., LTD., Shanghai (CN)

( * ) Notice: Subject to any disclaimer, the term of this patent is extended or adjusted under 35 U.S.C. 154(b) by 0 days.

(21) Appl. No.: 15/029,413

(22) PCT Filed: Oct. 16, 2014

(86) PCT No.: PCT/CN2014/088734
§ 371 (c)(1),
(2) Date: Apr. 14, 2016

(87) PCT Pub. No.: WO2015/055129
PCT Pub. Date: Apr. 23, 2015

(65) Prior Publication Data
US 2016/0224881 A1    Aug. 4, 2016

(30) Foreign Application Priority Data

Oct. 17, 2013  (CN) .......................... 2013 1 0485800

(51) Int. Cl.
*G06K 19/07* (2006.01)
*G06K 19/077* (2006.01)
*H04B 5/00* (2006.01)

(52) U.S. Cl.
CPC ... *G06K 19/07749* (2013.01); *G06K 19/0723* (2013.01); *H04B 5/0031* (2013.01); *H04B 5/0056* (2013.01)

(58) Field of Classification Search
CPC ...... H04B 5/0031; H04B 5/0056; H04B 5/02; H04B 5/0037; G06K 19/0723;
(Continued)

(56) References Cited

U.S. PATENT DOCUMENTS

| | | | | |
|---|---|---|---|---|
| 2009/0308937 A1* | 12/2009 | Yagi | .................. | G06K 19/0707 235/492 |
| 2010/0039234 A1* | 2/2010 | Soliven | .................... | H04B 5/02 340/10.1 |
| 2013/0078914 A1* | 3/2013 | Royston | ............... | H04B 5/0031 455/41.1 |

FOREIGN PATENT DOCUMENTS

| | | |
|---|---|---|
| CN | 1459986 A | 12/2003 |
| CN | 103117775 A | 5/2013 |

OTHER PUBLICATIONS

International Search Report issued in corresponding PCT Application No. PCT/CN2014/088734, date mailed Jan. 13, 2015, pp. 1-2.

* cited by examiner

*Primary Examiner* — Ali Neyzari
(74) *Attorney, Agent, or Firm* — MKG, LLC

(57) ABSTRACT

A load modulation circuit for radio frequency identification including a first load modulation module and a second load modulation module connected to a coupling circuit. Under weak field intensity, load modulation is mostly realized by the first load modulation module, with the second load modulation module contributing far less than the first load modulation module as regards to the load modulation waveform and load modulation depth. As field intensity increases, the first load modulation module contributes less and less to the load modulation waveform and load modulation depth. While field intensity increases, the second load modulation module contributes more and more to the load modulation waveform and load modulation depth under the control of a
(Continued)

variable voltage. Under strong filed intensity, load modulation is mostly realized by the second load modulation module.

5 Claims, 1 Drawing Sheet

(58) Field of Classification Search
CPC ........ G06K 19/07749; G06K 19/0709; H02M 7/062; H02M 7/04
USPC .......................... 340/10.1; 235/492; 455/41.1
See application file for complete search history.

LOAD MODULATION CIRCUIT FOR RADIO FREQUENCY IDENTIFICATION

The present invention relates to a load modulation circuit in an analog circuit, and relates in particular to a load modulation circuit for radio frequency identification.

BACKGROUND ART

In radio frequency identification, a radio frequency identification card couples an analogue signal sent by a card reader, demodulates the data as sent by the card reader via a radio frequency circuit in the card, and sends the data to a digital circuit for processing. The digital circuit sends the processed data back to the card reader via a load modulation circuit, thus the whole communication process is completed. The process in which the data is sent back to the card reader is load modulation. Unsatisfactory load modulation waveforms or load modulation depth would impact data demodulation by the card reader. Therefore, the load modulation circuit is important and crucial which shall has idea modulation waveform and enough load modulation depth under various cases of field intensity.

A load modulation circuit of prior art, as is shown by FIG. 1, is comprised of NMOS transistors MN1-MN3, and a phase inverter INV1. Wherein, the NMOS transistor MN3 is equivalent to a switch, being open during modulation, and closed otherwise, with the DIN being a load modulation signal provided and controlled by the digital circuit. The connection or closure of the NMOS transistor MN3 will have an impact over the antenna signals: when the NMOS transistor MN3 is connected, the signal on the antenna are pulled down to form a trough, the trough by trough signals constituting a load modulation wave which carries data to be finally demodulated by the card reader. The inductors L1, L2, and the capacitor C1 in FIG. 1 constitute a coupling circuit. The input signal IN is coupled to the card end via the inductors L1 and L2, while the load modulation wave from the card end can also be coupled to the card reader end.

Such a structure is advantageous in its simplicity and ease of implementation, with a quite good load modulation waveform and load modulation depth under weak field intensity; its disadvantages are poor load modulation waveform and modulation depth under strong field intensity, incorrect demodulated data by most card readers, or incorrect demodulation. Incorrect demodulation by the card reader will lead to total communication failure.

SUMMARY OF INVENTION

A technical problem the present invention aims to solve is to provide a load modulation circuit for radio frequency identification, which improves load modulation waveform and load modulation depth under strong field intensity, increases compatibility of radio frequency cards, and guarantees normal communication between a radio frequency card and a card reader.

To solve at least the afore-mentioned technical problem, the load modulation circuit for radio frequency identification of the present invention comprises a first load modulation module connected to a coupling circuit; and further comprises:

a second load modulation module connected to the coupling circuit; under a specific weak field intensity, load modulation is mostly realized by the first load modulation module, with the second load modulation module contributing far less than the first load modulation module as regards to the load modulation waveform and the load modulation depth; as field intensity increases, the first load modulation module contributes less and less to the load modulation waveform and the load modulation depth; while as field intensity increases, a variable voltage controlling the second load modulation module also increases and the second load modulation module contributes more and more to the load modulation waveform and the load modulation depth under the control of the variable voltage; under a specific strong filed intensity, the load modulation is mostly realized by the second load modulation module, with the first load modulation module contributing far less than the second load modulation module as to the load modulation waveform and the load modulation depth.

The load modulation circuit of the present invention adds an additional load modulation module to the load modulation circuit of prior art, that is, the additional load modulation module is controlled by a voltage which varies with the field intensity. When working under weak field intensity, the traditional load modulation circuit works normally, while the additional load modulation module has limited impact on load modulation due to a relatively small control voltage and thus a barely opened modulation MOS thereof. Hence load modulation is mostly realized by the load modulation module of prior art under weak field intensity. When the working field intensity increases, the load modulation module of prior art still functions, albeit with a poor load modulation waveform and load modulation depth, and contributing less and less to the load modulation waveform and load modulation depth as the field intensity increases. As for the adds-on load modulation module, the variable voltage controlling it increases with the increase of the field intensity, and the load modulation MOS which controlled by the variable voltage opens wider and wider, and the adds-on load modulation module begins to function and to contribute to the load modulation waveform and the load modulation depth. As the working field intensity continues to increase, for example when increasing to 7.5 A/m, which being a strong field intensity, the voltage on both ends of the antenna will also be very large, resulting in saturation of the load modulation module of prior art and very small contribution therefrom to the load modulation waveform and the load modulation depth. As for the adds-on load modulation module, with an already quite large voltage controlling it, that is, a sufficiently opened load modulation MOS, furnishes a comparatively ideal load modulation waveform and load modulation depth under strong field intensity, and realizes most of the job of the load modulation.

The improved load modulation circuit generates a good load modulation waveform and a deep load modulation depth both under weak field intensity and strong field intensity. It improves load modulation waveform and load modulation depth under strong field intensity. Further, it substantially increases compatibility for radio frequency cards so as to be compatible to various card readers, and guarantees normal communication between a radio frequency card and a card reader.

BRIEF DESCRIPTION OF THE DRAWINGS

In combination with drawings and embodiments hereunder provided, the present invention will be enunciated in more details.

DETAILED DESCRIPTION

Figure 2:
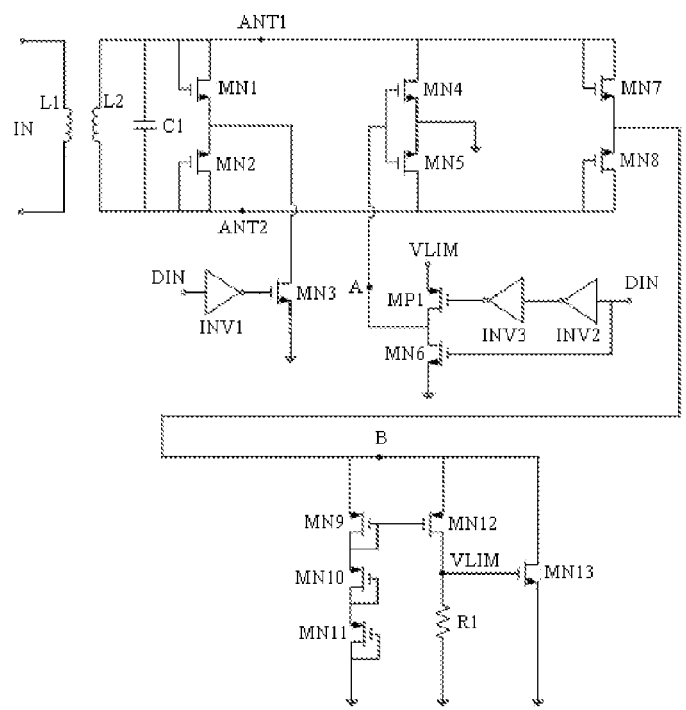
FIG. 2 shows a schematic diagram of the load modulation circuit for radio frequency modulation of the present invention.

As is shown on FIG. 2, the load modulation circuit for radio frequency identification of the present invention has two load modulation modules, that is, a first load modulation module and a second load modulation module. Both the load modulation modules are connected with a coupling circuit. An amplitude limiter circuit provides for the second load modulation module a variable voltage VLIM, which changes as the field intensity changes. When working under weak field intensity, the variable voltage VLIM is comparatively low, and will increase as the field intensity increases. When working under strong field intensity, the variable voltage VLIM will increase so as to be able to control the second load modulation module to participate in load modulation. The coupling circuit is comprised of inductors L1, L2, and a first capacitor (C1). The first capacitor C1 is connected in parallel with both ends of the inductor L2, an input signal IN is coupled to a radio frequency identification card via the inductors L1 and L2 and resonates with the first capacitor (C1) to generate a relatively high resonant voltage; at the meantime, a carrier signal and an envelope signal are coupled to the radio frequency card from a card reader. A demodulation circuit demodulates a corresponding digital signal from the envelope signal and then sends it to the digital circuit for processing. Data processed by the digital circuit also requires the coupling circuit to couple the data from the radio frequency identification card to the card reader. Coupling of data processed by the digital circuit from the radio frequency identification card to the card reader is conducted by means of load modulation, that is, the digital circuit realizes load modulation by means of controlling the voltage on the DIN end of the first load modulation module and the second load modulation module.

Figure 1:
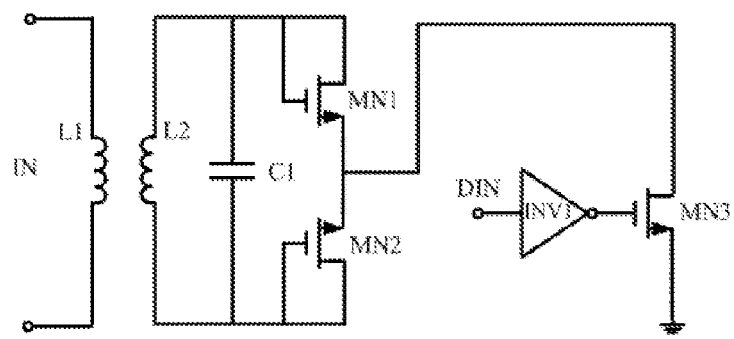
FIG. 1 shows a schematic diagram of a load modulation circuit of prior art.

The first load modulation module, being structurally identical to the load modulation circuit of prior art as is shown on FIG. 1, is involved in load modulation under all levels of field intensity ; but under strong field intensity it contributes less to load modulation.

The first load modulation module is comprised of a first NMOS transistor MN1, a second NMOS transistor MN2, a third NMOS transistor MN3, and a first phase inverter INV1.

The gate and the drain of the first NMOS transistor MN1 are connected with an end ANT1 of the second inductor L2 of the coupling circuit, the gate and the drain of the second NMOS transistor MN2 are connected with another end ANT2 of the second inductor L2 of the coupling circuit. A source of the first NMOS transistor MN1 and a source of the second NMOS transistor MN2 are connected with the drain of the third NMOS transistor MN3. A control signal DIN furnished by the digital circuit is inputted via an input port of the first phase inverter INV1. An output port of the first phase invert INV1 is connected with a gate of the third NMOS transistor MN3, with a source of the third NMOS transistor MN3 being grounded.

The second load modulation module is a newly added load modulation module, with its contribution to load modulation being reflected in the case of a strong field intensity.

The second load modulation module is comprised of a fourth NMOS transistor MN4, a fifth NMOS transistor MN5, a sixth NMOS transistor MN6, a first PMOS transistor MP1, a second phase inverter INV2, and a third phase inverter INV3.

The drain of the fourth NMOS transistor MN4 is connected with one end ANT1 of the second inductor L2 of the coupling circuit, the drain of the fifth NMOS transistor MN5 is connected with another end ANT2 of the second inductor L2 of the coupling circuit. A source of the fourth NMOS transistor MN4 and a source of the fifth NMOS transistor MN5 are grounded. The gate of the fourth NMOS transistor MN4 is connected with the gate of the fifth NMOS transistor MN5, with a node of connection being denoted as an end point A. A variable voltage VLIM furnished by an amplitude limiter circuit is inputted via a source of the first PMOS transistor MP1. The drain of the first PMOS transistor MP1 and the drain of the sixth NMOS transistor MN6 are connected with the end point A, with a source of the sixth NMOS transistor MN6 being grounded. An input port of the second phase inverter INV2 is connected with the gate of the sixth NMOS transistor MN6 for input of the control signal DIN. An output port of the second phase inverter INV2 is connected with an input port of the third phase inverter INV3, and an output port of the third phase inverter INV3 is connected with gate of the first PMOS transistor MP1.

The amplitude limiter circuit functions to ensure a stable voltage for point B on FIG. 2, as well as to provide a variable voltage VLIM for the second load modulation module in the embodiment.

The amplitude limiter circuit is comprised of a seventh NMOS MN7 transistor, an eighth NMOS transistor MN8, a ninth NMOS transistor MN9, a tenth NMOS transistor MN10, an eleventh NMOS transistor MN11, a twelfth NMOS transistor MN12, a thirteenth NMOS transistor MN13, and a first resistor R1.

The gate and the drain of the seventh NMOS transistor MN7 are connected with an end ANT1 of the second inductor L2 of the coupling circuit, the gate and the drain of the eighth NMOS transistor MN8 are connected with another end ANT2 of the second inductor L2 of the coupling circuit. A source of the seventh NMOS transistor MN7 is connected with a source of the eighth NMOS transistor MN8, with a point of connection being denoted as end point B. A source of the ninth NMOS transistor MN9, a source of the twelfth NMOS transistor MN12, and the drain of the thirteenth NMOS transistor MN13 are connected with the end point B. The gate and the drain of the ninth NMOS transistor MN9 are connected with the gate of the twelfth NMOS transistor MN12 and a source of the tenth NMOS transistor MN10. The gate and the drain of the tenth NMOS transistor MN10 are connected with a source of the eleventh NMOS transistor MN11. The gate and the drain of the eleventh NMOS transistor MN11 are grounded. The drain of the twelfth NMOS transistor MN12 is connected with an end of the first resistor R1 and the gate of the thirteenth NMOS transistor MN13, a voltage of a connection point thereof being the variable voltage VLIM. A source of the thirteenth NMOS MN13 transistor is grounded. When the voltage at point B increase and surpasses the sum of the threshold voltages of the ninth NMOS transistor MN9, the tenth NMOS transistor MN10, and the eleventh NMOS transistor MN11, the value of the variable voltage VLIM will increase and gradually opens the thirteenth NMOS transistor MN13 for release of surpass current, and the voltage at point B will decrease and remain stable at the sum of the threshold voltages of the ninth NMOS transistor MN9, the tenth NMOS transistor MN10, and the eleventh NMOS transistor MN11. Hence, the value of the variable voltage VLIM changes in response to the changing field intensity, with a small variable VLIM voltage value corresponding to a small field intensity value, and a large variable VLIM voltage value corresponding to a large field intensity value.

Under a small field intensity, the third NMOS transistor MN3 opens at a low level of the modulation control signal DIN to control initiation of load modulation through the first NMOS transistor MN1 and the second NMOS transistor MN2, for which the first load modulation module plays a crucial role, due to the good load modulation waveform and load modulation depth it provides. While for the second load modulation module, the sixth NMOS transistor MN6 thereof is first closed at the low level of the modulation control signal DIN, then the first PMOS transistor MP1 is turned on to transmit the variable voltage VLIM provided by the amplitude limiter circuit to point A. As the voltage at point A controls the turning on and off of the NMOS transistors MN4 and MN5, the second load modulation module also starts to conduct load modulation. Due to the small value of the field intensity, the value of the variable voltage VLIM is comparatively low, and hence the NMOS transistors MN4 and MN5 are barely or not turned on at all, and therefore the contribution from the second load modulation module to the load modulation waveform and the load modulation depth is relatively small.

As the working field intensity increases, the first load modulation module still functions, albeit with a poor load modulation waveform and load modulation depth, and contributing less and less to the load modulation waveform and load modulation depth as the field intensity increases. As for the second load modulation module, the voltage controlling it increases with the increase of the field intensity. As the variable voltage VLIM provided by the amplitude limiter circuit increases, the voltage at point A also increases, that is, the NMOS transistors MN4 and MN5 turn on gradually to participate in load modulation. The load modulation waveform and the load modulation depth are thus jointly decided by the two load modulation circuits, with their contribution being dependent on the changing field intensity. The smaller the field intensity value is, the less the contribution from the second load modulation module become; the larger the field intensity value is, the larger the contribution therefrom become.

As the working field intensity continues to increase, for example when increasing to 7.5 A/m, which being a strong field intensity, the voltage on both ends of the antenna will also be very large, resulting in saturation of the first load modulation module circuit and very small contribution therefrom to the load modulation waveform and the load modulation depth. As for the second load modulation module, with an already quite large voltage controlling it, that is, a sufficiently opened load modulation valve, furnishes a comparatively ideal load modulation waveform and a load modulation depth under strong field intensity, and realizes most of the function of the load modulation, with a comparatively small contribution from the first load modulation module. Therefore, the present invention has a good load modulation waveform and load modulation depth under medium and large field intensity, as well as under a small one.

The working field intensity for a radio frequency identification card is generally 1.5 A/m-7.5 A/m. For various radio frequency identification cards, the definition of large field intensity may vary, with field intensity over 6 A/m or 7 a/m being considered as a large one.

Similarly, for various radio frequency identification cards, the definition of small field intensity may vary considerably, with field intensity smaller than 1.5 A/m being considered as a small one.

The present invention has thus been fully explained by specific embodiments, but is not meant to be limited thereby. A person of the art shall be able to make various modifications of, or to combine the embodiments with reference to the present specification without departure from the spirit and scope of the present invention, which shall fall within the scope of protection of the present invention.

What is claimed is:

1. A load modulation circuit for radio frequency identification comprising a first load modulation module connected to a coupling circuit, further comprises: a second load modulation module connected to the coupling circuit; under a specific weak field intensity, load modulation is mostly realized by the first load modulation module, with the second load modulation module contributing far less than the first load modulation module to a load modulation waveform and a load modulation depth; as field intensity increases, the first load modulation module contributes less and less to the load modulation waveform and the load modulation depth; while as the field intensity increases, a variable voltage controlling the second load modulation module also increases and the second load modulation module contributes more and more to the load modulation waveform and the load modulation depth under the control of the variable voltage; under a specific strong filed intensity, the load modulation is mostly realized by the second load modulation module, with the first load modulation module contributing far less than the second load modulation module to the load modulation waveform and the load modulation depth.

2. The load modulation circuit for radio frequency identification of claim 1, wherein:
the coupling circuit is comprised of a first inductor (L1), a second inductor (L2), and a first capacitor (C1); the first capacitor(C1) is connected in parallel with both ends of the second inductor (L2), an input signal IN is coupled to a radio frequency identification card via the first inductor (L1) and the second inductor (L2) and resonates with the first capacitor (C1) to generate a resonant voltage; at the meantime, carrier signal and envelope signal are coupled to the radio frequency identification card from a card reader; data processed by a digital circuit also requires to be coupled from the radio frequency identification card to the card reader by the coupling circuit.

3. The load modulation circuit for radio frequency identification of claim 1, wherein:
the first load modulation module is comprised of a first NMOS transistor (MN1), a second NMOS transistor (MN2), a third NMOS transistor (MN3), and a first phase inverter; and
a gate and a drain of the first NMOS transistor (MN1) are connected with an end (ANT1) of the second inductor (L2), a gate and a drain of the second NMOS transistor (MN2) are connected with another end (ANT2) of a second inductor (L2); a source of the first NMOS transistor (MN1) and a source of the second NMOS transistor (MN2) are connected with the drain of the third NMOS transistor (MN3); a control signal DIN furnished by a digital circuit is inputted via an input port of a first phase inverter (INV1); an output port of the first phase inverter (INV1) is connected with a gate of the third NMOS transistor (MN3), with a source of the third NMOS transistor (MN3) being grounded.

4. The load modulation circuit for radio frequency identification of claim 1, wherein:

the second load modulation module is comprised of a fourth NMOS transistor (MN4), a fifth NMOS transistor (MN5), a sixth NMOS transistor (MN6), a first PMOS transistor (MP1), a second phase inverter (INV2), and a third phase inverter (INV3);

a drain of the fourth NMOS transistor (MN4) is connected with an end (ANTI) of a second inductor (L2) of the coupling circuit, a drain of the fifth NMOS transistor (MN5) is connected with another end (ANT2) of the second inductor (L2) of the coupling circuit; a source of the fourth NMOS transistor (MN4) and a source of the fifth NMOS transistor (MN5) are grounded; a gate of the fourth NMOS transistor (MN4) is connected with a gate of the fifth NMOS transistor (MN5), with a node of connection being denoted as an end point A; a variable voltage VLIM furnished by an amplitude limiter circuit is inputted via a source of the first PMOS transistor (MP1); a drain of the first PMOS transistor (MP1) and a drain of the sixth NMOS transistor (MN6) are connected with the end point A, with a source of the sixth NMOS transistor (MN6) being grounded; an input port of the second phase inverter (INV2) is connected with a gate of the sixth NMOS transistor (MN6) for input of the control signal DIN; an output port of the second phase inverter (INV2) is connected with an input port of the third phase inverter (INV3), and an output port of the third phase inverter (INV3) is connected a gate of the first PMOS transistor (MP1).

5. The load modulation circuit for radio frequency identification of claim 4, wherein:

the amplitude limit circuit is comprised of a seventh NMOS transistor (MN7), an eighth NMOS transistor (MN8), a ninth NMOS transistor (MN9), a tenth NMOS transistor (MN10), an eleventh NMOS transistor (MN11), a twelfth NMOS transistor (MN12), a thirteenth NMOS transistor (MN13), and a first resistor (R1);

a gate and a drain of the seventh NMOS transistor (MN7) are connected with an end (ANT1) of the second inductor (L2) of the coupling circuit, a gate and a drain of the eighth NMOS transistor (MN8) are connected with another end (ANT2) of the second inductor (L2) of the coupling circuit; a source of the seventh NMOS transistor (MN7) is connected with a source of the eighth NMOS transistor (MN8), with a point of connection being denoted as end point B; a source of the ninth NMOS transistor (MN9), a source of the twelfth NMOS transistor (MN12), and the drain of the thirteenth NMOS transistor (MN13) are connected with the end point B; a gate and a drain of the ninth NMOS transistor (MN9) are connected with a gate of the twelfth NMOS transistor (MN12) and a source of the tenth NMOS transistor (MN10); a gate and a drain of the tenth NMOS transistor (MN10) are connected with a source of the eleventh NMOS transistor (MN11); a gate and a drain of the eleventh NMOS transistor (MN11) are grounded; a drain of the twelfth NMOS transistor (MN12) is connected with an end of the first resistor R1 and the gate of the thirteenth NMOS transistor (MN13), a voltage of a connection point thereof being the variable voltage VLIM; a source of the thirteenth NMOS transistor (MN13) is grounded.

\* \* \* \* \*